United States Patent [19]
Carman

[11] 3,884,104
[45] May 20, 1975

[54] APPARATUS FOR PRODUCING PATTERNED OBJECTS OUT OF PLASTIC MATERIAL

[76] Inventor: Alva G. Carman, 4907 River Rd. North, Salem, Oreg. 97303

[22] Filed: Oct. 23, 1973

[21] Appl. No.: 408,631

[52] U.S. Cl. ................................. 83/171; 83/651.1
[51] Int. Cl. ............................................. B26f 3/12
[58] Field of Search ............ 83/171, 16, 565, 651.1, 83/648

[56] References Cited
UNITED STATES PATENTS

| | | | |
|---|---|---|---|
| 2,646,494 | 7/1953 | Fegan | 83/171 |
| 2,987,598 | 6/1961 | Chace et al. | 83/171 |
| 3,018,355 | 1/1962 | Wallerstein | 83/171 |
| 3,199,388 | 8/1965 | Redfield | 83/171 X |
| 3,797,344 | 3/1974 | Hattman | 83/171 |

Primary Examiner—Frank T. Yost
Attorney, Agent, or Firm—James D. Givnan, Jr.

[57] ABSTRACT

Apparatus comprising a smooth table top adapted to slidably support a workpiece of plastic material, preferably of the styrofoam type. A cutting element comprising a strand of wire is selectively extensible through a vertical opening in the table top and through an overlying workpiece of the plastic material. Electrical conductors from a source of controlled electrical current are connected one each to the top and bottom ends of said cutting element and adapted to energize the same to various degrees of temperature to enable the element to cut or melt through the workpiece as guided by the edges of a pattern or tamplate removably secured to the workpiece. A lever is superimposed upon said table top and divided by a fulcrum into a load arm and a lever arm. The outer end of the load arm is attached to the top of the strand of cutting element whereby gravitational forces applied to the lever arm will apply lifting forces to the load arm to maintain the cutting element in vertical cutting tension at all times.

2 Claims, 5 Drawing Figures

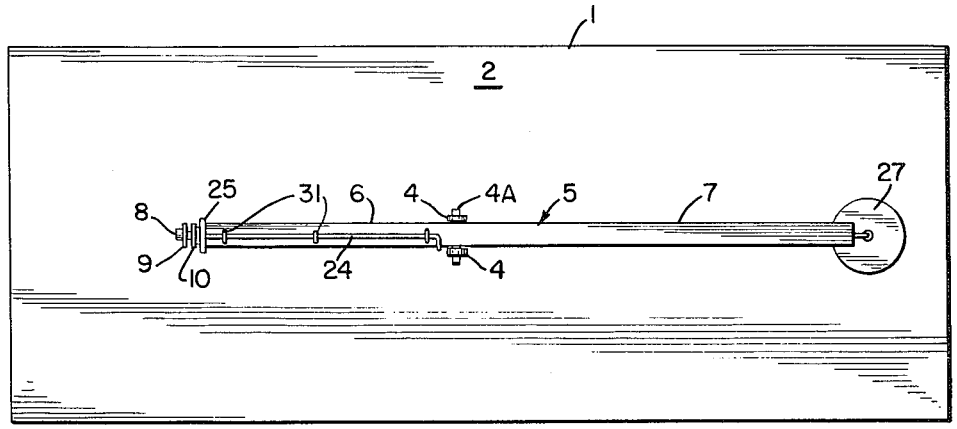
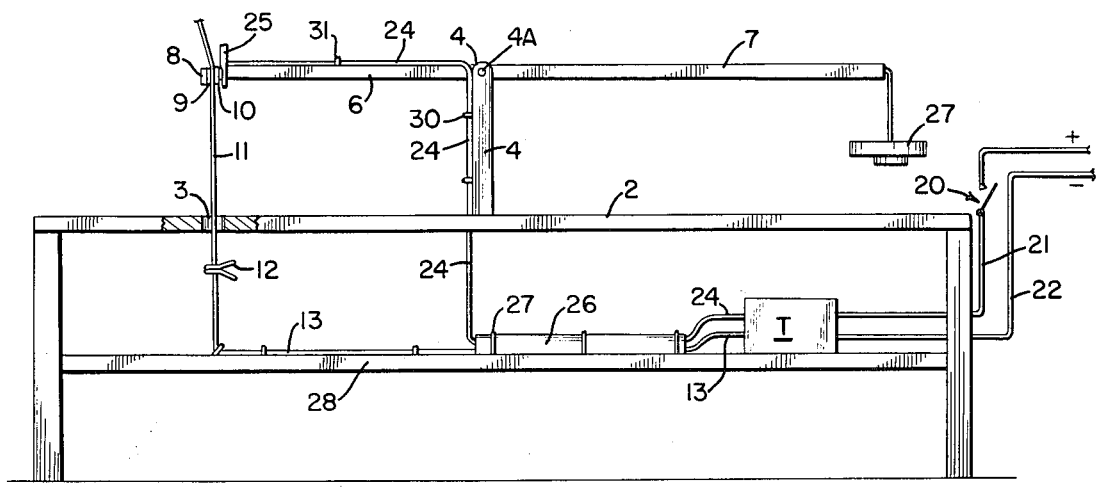
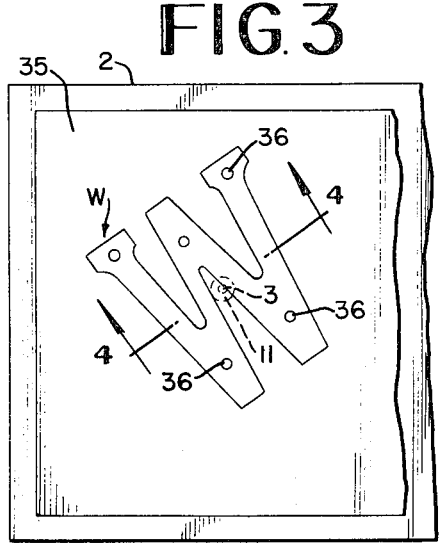
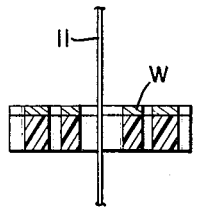
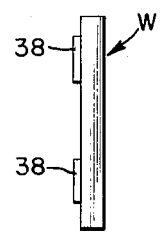

APPARATUS FOR PRODUCING PATTERNED OBJECTS OUT OF PLASTIC MATERIAL

This invention relates to improvements in apparatus for producing objects out of a workpiece of plastic material in accordance with templates or patterns removably secured to the workpiece.

The objects of the invention are:

To provide apparatus of the character described which is of simple, efficient, durable, inexpensive construction consisting of no moving parts except a lever arm adapted to maintain tension on a fixedly mounted cutting element extending through a smooth table top upon which a workpiece, having a template or pattern removably secured thereto, can be easily manipulated to maintain the cutting element in following contact with the edges of the template and thus cut the object in accurate conformity with the pattern and the sidewalls thereof perpendicular to the table top.

To provide apparatus of the character described which is foolproof in operation and accurate in the production of patterned objects without any particular skill on the part of the operator since all that is necessary is to maintain the pattern in sliding contact with the hot strand of cutting element.

The foregoing and other objects and advantages which will become subsequently apparent, reside in the details of construction and operation as more fully hereinafter described and claimed, reference being had to the accompanying drawing forming a part hereof and in which:

FIG. 1 is a top plan view of apparatus made in accordance with my invention.

FIG. 2 is a side elevational view of FIG. 1 with a fragment broken away for convenience of illustration.

FIG. 3 is a fragmentary top plan view of the table top, on a slightly enlarged scale, illustrating diagrammatically a patterned workpiece being manipulated relative to a cutting element.

FIG. 4 is a sectional detail view, on an enlarged scale, taken approximately along the line 4—4 of FIG. 3, and FIG. 5 is a side elevational view of a finished object.

With continuing reference to the drawing wherein like reference numerals designate like parts, numeral 1 indicates generally a table including a top 2 which has an opening 3 extending therethrough.

Mounted upon the table top in any suitable manner, preferably on the longitudinal centerline thereof, is a standard 4 whose top end is formed into or provided with a fulcrum 4A for a lever indicated generally at 5, divided into a load arm 6 and a lever arm 7. The forward end of the load arm is provided with a screw fastener 8 extending through washers 9 and 10 for clamping the top end of a cutting element in the form of a length of stainless steel wire 11. The top end of wire 11 is secured between the washers 9 and 10 to the terminal end of the load arm and extends therebeyond as shown. The bottom end of the cutting element 11 extends through and below the opening 3 in the table top and is secured by a clamp 12 to one end of an electrical conductor or wire 13 whose opposite end is connected to one (output) side of a step-down electrical transformer T which if desired could be the type used for charging batteries wherein 115 volt input is reduced for example to 12 Volts and 9 Amperes.

Electrical current from a source is fed through a switch 20 and conductors 21, 22 to the input side of the transformer T.

The other side of the output end of the transformer is connected by wire 24 to a terminal clamp 25 by means of which wire 24 is electrically connected to the screw fastener 8 and hence to the cutting element 11.

Since it is important that the cutting element be in tension at all times for accuracy in the cutting operation, the lever arm 7 is provided with a weight or weights 27.

Wires 13 and 24 extend through a conduit 26 of insulating material which is secured as at 27 to a cross member 28 of the table 1. The portion of wire 13 extending forwardly from the conduit 26 is also stapled to the table cross member 28. The upward extension of wire 24 is stapled as at 30 to the standard 4 and the forward extension of wire 24 is stapled as at 31 to the load arm 6.

With particular reference to FIG. 3 wherein a workpiece 35 is maneuverable in all directions over the table top 2, a template in the shape of the capital W shown, for example, is firmly but temporarily secured to the top surface of the workpiece by pins 36, thumbtacks, or the like. The top surface of the workpiece may be of any desired color.

The previously mentioned electrical charge of 12 Volts through the cutting element 11 generates sufficient heat to melt through the workpiece along a hairline following the outline of the template (see FIG. 3) as long as the cutting element is maintained in sliding contact with the template. Since the temperature is not sufficient to render the template combustible, it may be made of cardboard, fibre glass, or the like but to render the templates more durable and longer lasting, the same could be made of metal.

The perimetric surface of the finished objects will be of a glazed or glossy finish due to the melting action of the cutting element in contrast to such surfaces when cut by a band saw, jig saw, or the like.

Moreover, the finished objects may be permanently secured to supporting surfaces, such as wooden panels or the like, by a proper adhesive, or removably attached to such surfaces made of metal by attaching strips of electro-magnetic material 38 to the rearward face or surface of the finished objects.

What I claim is:

1. Apparatus for producing patterned objects out of plastic material, comprising in combination, a horizontal work surface having an opening therethrough, a beam superimposed upon said work surface rockably mounted relative thereto and divided into a lever arm and a load arm, a cutting element extending upwardly through said opening in said work surface and attached at its upper end to the beam end constituting the end of the load arm, electrical conductors extending from a source of controlled electrical current and connected one each to the top and bottom ends of said cutting element to selectively energize said cutting element to various degrees of temperature, and whereby gravitational forces applied to said lever arm will transmit lifting forces to said load arm to maintain said element in tension at all times.

2. Apparatus as claimed in claim 1, wherein the end of the reach of said load arm terminates substantially in alignment with said opening in the table top, wherein said cutting element comprises a strand of wire extending through said opening in the table top and removably secured at its upper end to the terminal end of the reach of said load arm,
an electrical transformer in circuit at one of its ends with a source of electric current, and two sides of the opposite end of said transformer connected respectively to the top end of said cutting element above said table top and to the opposite end of said cutting element below the table top.

* * * * *